United States Patent
Smirnova et al.

(10) Patent No.: US 6,827,892 B2
(45) Date of Patent: Dec. 7, 2004

(54) METHOD OF PREPARING THIN-WALLED ARTICLES

(75) Inventors: Alevtina Smirnova, Mansfield, CT (US); Gary Mark Crosbie, Dearborn, MI (US); Robert Allan Pett, Franklin, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,031

(22) Filed: Nov. 9, 2001

(65) Prior Publication Data

US 2003/0090027 A1 May 15, 2003

(51) Int. Cl.[7] .............................. C08K 3/08; C08K 3/22
(52) U.S. Cl. ........................ 264/104; 264/150; 264/165; 264/176.1; 264/209.1
(58) Field of Search .......................... 264/63, 104, 150, 264/165, 209.1, 176.1, 221; 428/36.9

(56) References Cited

U.S. PATENT DOCUMENTS

| | | | |
|---|---|---|---|
| 4,283,360 A | 8/1981 | Henmi et al. ................. | 264/63 |
| 4,357,436 A | * 11/1982 | Zucker | |
| 4,615,851 A | * 10/1986 | Theodore et al. ............. | 264/63 |
| 5,087,595 A | 2/1992 | Marsh et al. ............... | 501/105 |
| 5,248,463 A | 9/1993 | Obitsu et al. ................. | 264/63 |
| 5,574,957 A | * 11/1996 | Barnard et al. ............... | 419/67 |
| 5,733,499 A | 3/1998 | Takeuchi et al. ............ | 264/650 |
| 5,935,514 A | 8/1999 | Ford, Jr. et al. ............ | 264/630 |
| 6,080,345 A | 6/2000 | Chalasani et al. .......... | 264/109 |

FOREIGN PATENT DOCUMENTS

| | | | |
|---|---|---|---|
| JP | 04119830 A | * | 4/1992 |
| JP | 03327216 A | * | 11/1992 |

OTHER PUBLICATIONS

Liang, Z and Blackburn, S., "Co-Extrusion of Solid Oxide Fuel Cell Functional Elements" 23rd Annual Conference on Composites, Advanced Ceramics, Materials, and Structures: B, vol. 20, Issue 4, 1999, pp. 587–594, The American Ceramic Society, Westerville, Ohio.

Omatete, O.O. and Nick, J.J., "Improved Gelcasting Systems" Ceram. Eng. Sci. Proc. 20 [3], 1999, pp. 241–248.

* cited by examiner

*Primary Examiner*—Sandra M. Nolan
(74) *Attorney, Agent, or Firm*—Damian Porcari

(57) ABSTRACT

A polymeric binder system and method of making, and a method for extruding thin-walled articles such as thin-walled tubes is provided. The extrusion method comprises providing a polymeric binder system comprising a substantially homogeneous solution of a polymeric binder and an organic solvent, adding a ceramic or metal powder to form a mixture, and evaporating the solvent from the mixture. The remaining mixture is then extruded from a die and heated to burn-off the binder and sinter the article.

15 Claims, No Drawings

METHOD OF PREPARING THIN-WALLED ARTICLES

BACKGROUND OF INVENTION

1. Field of the Invention

The present invention is directed to a polymeric binder system and method of making, a method of forming thin-walled articles by extrusion, and to articles produced thereby. More particularly, the invention relates to a polymeric binder system containing an organic solvent to lower the binder viscosity and form a uniform extrudable mixture at near-ambient temperatures.

2. Background of the Invention

Techniques are known for producing thick-walled articles by extrusion utilizing ceramic and metal powders which are combined with organic chemicals that function as binders. Such methods typically utilize polymeric binders, such as polyvinyl butyral (for example, Butvar® B-76, Solutia, Inc., St. Louis, Mo.), which are burned out by a combination of pyrolysis and oxidation to decompose the binder to gases. Such extrusion binders tend to melt before reacting and decomposing to gases, and are suitable for forming thick-walled articles in which the binder melting inside a three-dimensional porous green body provides capillarity that pulls the mass together. However, such binders are not satisfactory for forming thin-walled articles such as thin-walled electrolyte tubes. This is because the articles become distorted as the capillarity from the melted binder reduces the wall thickness as the sheet of (powder-filled) liquid becomes unstable in shape and breaks apart into droplets, analogous to the droplet formation from a thin stream of water dripping from a faucet. Even without droplet formation, the thin-walled shapes can become distorted by gravity acting on the green ceramics held together with the liquefied binder at the early stages of binder burn-out.

One partial solution to this ceramic processing problem has been to add materials such as a block copolymer of styrene/butadiene as part of a thermoplastic elastomer binder system. Such materials can be formed by traditional rubber-making techniques utilizing shear in two-roll mills. For example, a method of making thin-walled electrolyte tubes is described in commonly assigned U.S. Pat. No. 4,615,851, in which a thermoplastic elastomer is mixed with ceramic powder on hot rolls which are heated in excess of 200° C. The extrudable powder mixture prepared by this method allows thin-walled shapes to be formed, burned out, and sintered with little deformation of the thin walls, because the block copolymer remains a high viscosity liquid after melting until decomposition.

Because of the inconvenience of the high temperature rubber-making process to make the extrudable mass, there has been continued interest in the development of improved polymeric binder systems for ceramic and metal powders for injection molding and extrusion. For example, a polyacetal binder is used in Catamold® Ultraform ceramic-filled polyacetal injection molding polymeric binder system (BASF Corporation, Wyandotte, Mich.). Such a binder provides an advantage for burn-out of both thin- and thick-walled structures due to its nearly isothermal catalytic decomposition of the solid binder to gaseous phases. However, in the acetal process, the gases used in the catalyzed solid-to-gas volatilization reaction and the resulting gases are both toxic and flammable.

Yet another known binder system and process is referred to as "gelcasting." This process utilizes chemical monomers which are solidified by cross-linking immediately after intermixing with an activator in the moments just prior to injection into a closed mold. Although this binder system allows both thin and thick sections to be formed one-by-one in closed molds, it is not practical for use in high-volume, continuous shear forming operations such as extrusion of thin-walled tubular articles due to the short time that passes before the binder becomes like a solid. Furthermore, the monomer and activator are toxic. The binder solidification reaction in gelcasting differs from that of the thermoplastic elastomer system in that it is irreversible. This leads to further losses on processing and more constraints in scheduling of sequential processing steps.

Accordingly, there is still a need in the art for an improved polymeric binder system and method for forming extruded thin-walled articles that can be sintered with little deformation of the thin walls.

SUMMARY OF INVENTION

The present invention meets that need by providing a polymeric binder system and method for extruding thin-walled articles which does not require heat for preparation of the extrudable mixture. The polymeric binder components are dissolved with shear in an organic solvent, such as, for example, toluene or tetrahydrofuran, to form a liquid polymeric binder system which is then mixed with ceramic or metal powders. After removal of substantially all of the organic solvent by evaporation, the resulting extrudable mass may be extruded to form thin-walled tubes, which, upon firing through burn-out and sintering, retain their thin-walled form. Thus, the extrudable mixture of the polymeric binder system and powder provides an easy means to make thin-walled extruded articles that retain their shape upon subsequent ceramic processing.

According to one aspect of the present invention, a method of forming an extruded thin-walled article is provided comprising providing a polymeric binder system of a substantially homogeneous solution of a polymeric binder and an organic solvent. A ceramic or metal powder is then added to the polymeric binder system to form a slurry mixture. Preferably, the ceramic powder comprises yttria-stabilized zirconia. The metal precursor powder preferably comprises nickel oxide plus yttria-stabilized zirconia.

After addition of the ceramic or metal powder, the organic solvent is evaporated from the mixture, and the remaining mixture is extruded from a die to form a thin-walled article. The mixture is preferably extruded at a temperature of between about 100 to 135° C., and more preferably, about 120° C.

The method preferably further includes subsequent heating of the extruded thin-walled article to burn off the binder and to sinter the article.

By "thin-walled" article, it is meant an article having a wall thickness of less than about 2 mm, and preferably less than about 0.5 mm. For fuel cell applications, we have achieved extruded wall thicknesses as thin as 0.2 mm.

The polymeric binder system of the present invention includes a polymeric binder and an organic solvent, which together are subsequently used to intermix and bind together the ceramic or metal powder into a shaped form. The polymeric binder preferably comprises a thermoplastic block copolymer, a first thermoplastic polymer and a second thermoplastic polymer which is different from the first thermoplastic polymer, and a plasticizer. The thermoplastic block copolymer preferably comprises a copolymer of styrene and butadiene.

The first thermoplastic polymer preferably comprises polystyrene and the second thermoplastic polymer preferably comprises polyindene.

The plasticizer included in the polymeric binder preferably comprises at least one oil and at least one wax. The oils and waxes allow a wide range of melting temperatures within the polymeric binder system. Furthermore, the lower melting components provide porosity that is useful for the ease of subsequent burn-out of the thermoplastic block copolymers and the first and second thermoplastic polymers.

The polymeric binder may further include a processing aid such as an antioxidant to adjust thermal decomposition rates and to reduce any gas-blocking layer formation during burn-out.

The organic solvent in the polymeric binder system is preferably toluene or tetrahydrofuran. The organic solvent may also be selected from cyclohexane, methylcyclohexane, benzene, ethylbenzene, styrene, lower chlorinated aliphatic hydrocarbons, tetrahydrofurfuryl alcohol, phenol/acetone, dimethyltetrahydrofuran, dioxane, methyl ethyl ketone, diisopropylketone, cyclohexanone, ethyl acetate, butyl acetate, n-butyl phthalate, carbon disulfide, and tributyl phosphate.

The polymeric binder system of the present invention is preferably prepared by dissolving the polymeric binder components in the organic solvent to form a substantially homogeneous liquid. The components of the polymeric binder system are preferably mixed in the following order: thermoplastic block copolymer, organic solvent, (and optional antioxidant), followed by the addition of the remaining components in any order. Preferably, shear processing is applied to insure good intermixing of the polymeric components.

The polymeric binder system and method of the present invention provide an improvement over prior binder systems in that it is simpler to make the binder-powder mixture because the organic solvent allows the preparation of the polymeric binder system at lower temperatures of about 50° C. Solvent removal by evaporation also occurs at a lower temperature of about 50° C. (or other moderate temperature, including room temperature). In addition, there is increased reproducibility in the extruded articles over prior art rubber-compounding methods because the components in the binder (other than some of the organic solvent) are not lost by evaporation or burning off of some fractions of the polymeric binder system during the compounding process, a problem which occurs with prior art systems that require heating to 200° C. during manufacture of an extrudable material.

Accordingly, it is a feature of the present invention to provide a polymeric binder system and method for extruding thin-walled articles which does not require heating to high temperatures (greater than about 100° C.) to achieve mixing of the extrudable mass and which results in a thin-walled green ceramic article which retains its shape during and after burn-off and sintering. Other features and advantages of the invention will be apparent from the following description and the appended claims.

DETAILED DESCRIPTION

As discussed above, the polymeric binder system and method of the present invention provide an improvement over prior methods in that heat is not required to achieve mixing of the polymeric components with the ceramic and metal powders. The polymeric binder system is also cost efficient in that there is a reduced need for antioxidants, because the use of lower processing temperatures provides less exposure to oxidation.

In addition, the polymer binder system has the advantage that it can be prepared and stored separately (either with or without the organic solvent present) until needed for use with a given powder. A further advantage is that, by addition of more of the organic solvent, the viscosity of the polymeric binder system can be lowered to allow simplified intermixing with the ceramic or metal powder. With appropriate dilution, the polymeric binder system can be used to apply powder-based coatings by spraying, painting, or dip-coating. Alternatively, when the evaporation of the organic solvent is nearly complete, the mass can be shaped at room temperature by various conventional ceramic whiteware forming means.

In prior art polymeric binder systems which do not use an organic solvent, the mixing of powders with the binder must take place at elevated temperatures in order to reduce binder viscosity.

The organic solvent used in the present invention is preferably selected from a particular class of solvents which are solvents for the glassy polymer in the glassy-elastomeric block copolymer. Where the glassy segment comprises polystyrene, the preferred solvents are toluene and tetrahydrofuran. However, there are many other organic liquids which may be used which are known solvents for this glassy segment of the thermoplastic block copolymer. For example, in the reference work entitled Polymer Handbook, edited by Johannes Brandrup and E. H. Immergut, published by J. Wiley & Sons, New York, 1966, solvents for atactic polystyrene include: cyclohexane, methylcyclohexane, benzene, ethylbenzene, styrene, lower chlorinated aliphatic hydrocarbons, tetrahydrofurfuryl alcohol, phenol/acetone, dimethyltetrahydrofuran, dioxane, methyl ethyl ketone, diisopropylketone, cyclohexanone, ethyl acetate, butyl acetate, n-butyl phthalate, carbon disulfide, and tributyl phosphate, among others. It should be appreciated that in polymeric binder systems where the glassy segment of the block copolymer does not comprise polystyrene, different solvents may be used.

The polymeric binder system of the present invention includes a thermoplastic block copolymer. The thermoplastic block copolymer may comprise either a radial or linear block copolymer, but preferably comprises a radial copolymer. Suitable thermoplastic block copolymers including linear and radial block copolymers are described in commonly assigned U.S. Pat. No. 4,615,851, the disclosure of which is incorporated herein by reference. The thermoplastic block copolymer preferably comprises a copolymer of styrene and butadiene. The polybutadiene segment of the copolymer behaves as an elastomer while the polystyrene segment behaves as a glassy or crystalline solid (as if it were a single chemical at room temperature). A preferred block copolymer is Calprene®, commercially available from Repsol Quimica, S.A. Other suitable block copolymers include Solprene® 411 (Dynasol Corp., Houston, Tex.).

The polymeric binder system also preferably includes first and second thermoplastic polymers, where the second polymer is different from the first polymer. The use of two different polymers allows sequential expulsion of the added single polymers during sintering. The thermoplastic polymers also function as tackifiers, and aid in stiffening the components in the polymeric binder. The first thermoplastic polymer preferably comprises a thermoplastic polystyrene polymer such as Styron® 495, commercially available from Dow Chemical Company. A preferred second thermoplastic polymer is polyindene, such as Picco® resin, commercially available from Hercules of Wilmington, Del. (now a part of Eastman Chemicals).

The polymeric binder system further includes a plasticizer comprising at least one oil and one wax. Suitable oils and waxes for use in the present invention include naphthenic, paraffinic, or an admixture of paraffinic and naphthenic components. The oils and waxes should be sufficiently volatile to be removed easily and rapidly in the burn-out process but insufficiently volatile to be substantially removed during mixing and/or extrusion. The oils and waxes should be selected such that their evolution during burnout takes place over a broad temperature range, thus avoiding stress points and defects in the resulting articles.

Examples of suitable commercially available oils include Flexon® 580, 680, 765 and 845 paraffinic petroleum oils, available from Exxon, and Shellflex® 131, 371 and 790, available from Shell Chemical Co. Preferred waxes for use include Sunoco Wax® 3420, 4412 and 4418, commercially available from Sun Chemical, as well as paraffin wax, commercially available from International Wax Refining.

The polymeric binder system may also optionally include additional processing aids to improve the flow characteristics of the binder-powder mixture. Examples of suitable processing aids include stearic acid, polyethylene, polyethylene wax, admixtures of natural waxes and wax derivatives, vegetable fats, partially oxidized polyethylene, etc.

The polymeric binder system may also optionally include antioxidants to retard oxidative degradation of the block polymer during mixing, thus minimizing loss of strength in the extruded thin-walled article. The addition of an antioxidant also allows more rapid elimination of the binder during burn-off by minimizing surface oxidation which may tend to seal off the surface. Suitable antioxidants include, but are not limited to, 2,6-ditert-butyl-phenol, polymerized 1,2-dihydro-2,2,4-trimethyl quinoline, 2-mercaptobenzimidazole, tetra-bis-methylene-3-(3,5-ditert-butyl-4-hydroxy phenyl)-propionate methane, etc. A preferred antioxidant is AgeRite® resin D, commercially available from R. T. Vanderbilt (1,2-dihydro-2,2,4-trimethyl quinoline).

The preferred ceramic or metal powders used with the polymeric binder system preferably include yttria-stabilized zirconia and a mixture of nickel oxide and yttria-stabilized zirconia. In the making of thin-walled solid electrolyte tubes or sheets for fuel cells, the preferred powder is yttria-stabilized zirconia. In the making of anode-supported fuel cells, the preferred powder is a mixture of nickel oxide and yttria-stabilized zirconia. However, it should be appreciated that there a number of different ceramic or metal powders may be used, since the polymeric binder system is essentially free of water.

The ceramic or metal powders preferably have an average particle size of from about 0.1 to about 20 microns. This size is preferred for sintering after binder burnout but is not critical for the performance of the polymeric binder system. The volume ratio of polymeric binder system (without the organic solvent) to ceramic/metal material is preferably from about 3:1 to 1:3. To achieve final ceramic objects of high density (relative to highest possible theoretical density for the particular ceramic) and for powders of size ranges which pack together well, a preferred ratio is about 1:3 (binder:powder). To achieve ceramic objects having a desired level of porosity and for powders which do not pack together well, the preferred ratio is about 3:1 (binder:powder).

The components of the polymeric binder system are preferably combined in the following manner in order to obtain a substantially homogeneous solution which is easily extrudable into the desired shape, such as thin-walled tubes. The block copolymer and optional antioxidant should first be dissolved with shear in the organic solvent to obtain a substantially homogeneous solution. All other organic components may then be added and mixed with the application of shear. Shear may be applied by use of a laboratory-type magnetic spin-bar which is preferably spun on the bottom of a glass beaker positioned on a hot plate, such as a Fisher Scientific Thermix® Stirring Hot Plate, Model No. 310 T. After all the added organic components are dissolved, the mixed polymeric binder system may be 1) stored for future use (with or without the organic solvent present) or 2) the ceramic or metal powder may be added with shear. The mixture is ready for extrusion when the solvent has been substantially evaporated. The solvent is preferably evaporated from the mixture at room temperature or by heating to about 50° C.

The mixture of the preferred polymer binder system and powders is preferably extruded at a temperature of about 120° C., followed by binder burn-out, which is preferably carried out at a temperature ramped at 1° C. per minute from between room temperature to 500° C., held at 500° C. for 2 hours, and ramped to sintering temperature at 3° C./minute. The preferred heating rate is a much faster rate in which the heating rate is only slowed down within limited, critical temperature intervals. The article is then preferably sintered at a temperature that is appropriate for the particular ceramic or metal powders. In the case of NiO-YSZ for anode precursor ceramics, the article is preferably sintered at a temperature between about 1200 and 1350° C. for 2 hours in air.

While the invention has been described herein primarily with regarding to extrusion, it should be appreciated that the polymeric binder system and method could be applied to other shear-induced forming processes including calendering and injection molding.

In order that the invention may be more readily understood, reference is made to the following examples, which are intended to be illustrative of the invention, but are not intended to be limiting in scope.

EXAMPLE 1

A polymeric binder system was prepared in accordance with the present invention using the materials and amounts listed below in Table 1.

TABLE 1

| Material | Amount (gram) |
| --- | --- |
| Polystyrene[1] | 0.7 |
| Thermoplastic block copolymer[2] | 4.8 |
| Wax 1[3] | 1.0 |
| Wax 2[4] | 1.0 |
| Polyindene[5] | 0.7 |
| Oil[6] | 1.0 |
| Oil[7] | 1.7 |
| Antioxidant[8] | 0.85 |
| YSZ | 45.0 |

[1]Styron ® 495, high impact polystyrene resin (Dow Chemical Company, Midland, MI)
[2]Calprene ® high molecular weight radial styrene-butadiene block copolymer with 30% styrene content (Dynasol Corp., Houston, TX)
[3]Paraffin wax, melting point 58–62° C., (#32721-2, Sigma-Aldrich, Milwaukee, WI)
[4]Paraffin wax, melting point 52–58° C.,(#31765-9, Sigma-Aldrich, Milwaukee, WI)
[5]Picco ® 5140 aromatic hydrocarbon resin (Hercules, Inc. [now part of Eastman Chemicals])
[6]Flexon ® 845, paraffinic petroleum oil (Exxon Corp.)
[7]Shellflex ® 371, hydrotreated heavy naphthenic distillate (Equilon Enterprises LLC, Houston, TX)
[8]AgeRite ® Resin D powder (R. T. Vanderbilt, Norwalk, CT)

The preparation of the polymer binder system was initiated by the addition of the thermoplastic block copolymer (Calprene®) to toluene heated at about 50° C. with stirring to provide shear. The antioxidant (AgeRite®) was then added. The two thermoplastic polymers (polystyrene and polyindene) were then added and completely dissolved in the toluene solution with continued stirring at 50° C. To the resulting homogeneous solution were added the two paraffinic waxes (with different softening points of about 52 and 58° C.), and the two oils with different boiling points (Flexon® and Shellflex®). Into this homogeneous yellow binder solution the YSZ ceramic powder material was added and then mixed to form a slurry. The resulting opaque slurry was allowed to sit for several hours with slight heating at about 50° C. with stirring to evaporate the toluene solvent.

To perform the extrusion, the dried slurry was cut into pieces and put into an extruder. The extruder was preheated for 15 to 30 minutes at 80° C. and then for an additional 5 to 10 minutes with heating up to 110 to 120° C. in order to reach the softening point of the slurry. At extrusion temperature, a pressure of about 13.8 to 20.6 MPa (2000–3000 pound/inch$^2$) was used to obtain green ceramic tubes at an extrusion rate about 600 mm/min.

A typical binder burn-out and sintering schedule is shown below in Table 2.

TABLE 2

| Temperature range, ° C. | Rate, ° C./min |
|---|---|
| 25 to 500° C. | 1 |
| 500° C. | hold for 2 hours |
| 500 to 1450° C. | 3 |
| 1450° C. | hold for 2 hours |
| 1450 to 21° C. | 3 |

After sintering, dense tubes having a diameter of 2.8 mm and wall thickness of 0.2 mm were obtained.

The tubes maintained their as-extruded shape and exhibited a fine grain microstructure with only a small number of isolated pores.

EXAMPLE 2

A polymeric binder system was prepared using the same materials as in Example 1, but without an antioxidant. Good extrusion and burn-out qualities were obtained.

EXAMPLE 3

A polymeric binder system was prepared using the same materials as in Example 1, but with a higher volume fraction of ceramic material. The ratio of the volume of the polymer (other than the organic solvent) to the volume of the YSZ powder was 1:2 for 60 vol. % of powder solids. Good extrusion and burn-out qualities were obtained.

EXAMPLE 4

A polymeric binder system was prepared using the same materials as in Example 1, with the exception that 5% of the organic solvent remained in the extrudable mass by incomplete evaporation of the toluene. Although this resulted in lower pressures for extrusion, more surface defects and pores were found in the extruded green body.

EXAMPLE 5

A polymeric binder system was prepared using the same materials as in Example 1, but with the use of tetrahydrofuran (THF) as the organic solvent in place of toluene. The substitution of THF resulted in faster evaporation of the solvent. Good extrusion and burn-out qualities were obtained.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of forming an extruded thin-walled article comprising:

providing a polymeric binder system comprising a substantially homogeneous solution of a thermoplastic elastomer polymeric binder and an organic solvent which is a solvent for the glassy segment in said thermoplastic elastomer polymeric binder;

wherein said solvent is in liquid form at room temperature;

adding a ceramic or metal powder to said polymeric binder system to form a mixture;

evaporating said organic solvent from said mixture; and extruding the remaining mixture from a die to form a thin-walled green article.

2. The method of claim 1 further including heating said extruded thin-walled green article to burn-off said binder and to sinter the article.

3. The method of claim 1 wherein said polymeric binder comprises a thermoplastic block copolymer, a first thermoplastic polymer, a second thermoplastic polymer different from said first thermoplastic polymer, and a plasticizer.

4. The method of claim 3 wherein said thermoplastic block copolymer comprises a copolymer of styrene and butadiene.

5. The method of claim 3 wherein said first thermoplastic polymer comprises polystyrene.

6. The method of claim 3 wherein said second thermoplastic polymer comprises polyindene.

7. The method of claim 3 wherein said polymeric binder further includes an antioxidant.

8. The method of claim 3 wherein said plasticizer comprises at least one oil and at least one wax.

9. The method of claim 1 wherein said solvent is toluene or tetrahydrofuran.

10. The method of claim 1 wherein said solvent is selected from cyclohexane, methylcyclohexane, benzene, ethylbenzene, styrene, lower chlorinated aliphatic hydrocarbons, tetrahydrofurfuryl alcohol, phenol/acetone, dimethyltetrahydrofuran, dioxane, methyl ethyl ketone, diisopropylketone, cyclohexanone, ethyl acetate, butyl acetate, n-butyl phthalate, carbon disulfide, and tributyl phosphate.

11. The method of claim 1 wherein said remaining mixture is extruded at a temperature of between about 100 to 135° C.

12. The method of claim 1 wherein said ceramic powder comprises yttria-stabilized zirconia.

13. The method of claim 1 wherein said metal powder comprises nickel oxide plus yttria-stabilized zirconia.

14. A method of forming an extruded thin-walled article comprising:

providing a polymeric binder system comprising a substantially homogeneous solution of a thermoplastic elastomer polymeric binder and an organic solvent which is a solvent for the glassy segment of said thermoplastic elastomer polymeric binder;

adding a ceramic or metal powder to said polymeric binder system to form a mixture; wherein said binder system and powder are mixed at a temperature of about 500° C.;

evaporating said organic solvent from said mixture; and extruding the remaining mixture from a die to form a thin-walled green article.

15. A method of forming an extruded thin-walled article comprising:

providing a polymeric binder system comprising a substantially homogeneous solution of a thermoplastic elastomer polymeric binder and an organic solvent which is a solvent for the glassy segment of said thermoplastic elastomer polymeric binder;

adding a ceramic or metal powder to said polymeric binder system form a mixture; wherein said organic solvent reduces the viscosity of said binder system to allow mixing of said binder system and powder at temperatures below 100° C.;

evaporating said organic solvent from said mixture; and extruding the remaining mixture from a die to form a thin-walled green article.

* * * * *

UNITED STATES PATENT AND TRADEMARK OFFICE
CERTIFICATE OF CORRECTION

| | |
|---|---|
| PATENT NO. | : 6,827,892 B2 |
| DATED | : December 7, 2004 |
| INVENTOR(S) | : Alevtina Smirnova, Gary Mark Crosbie and Robert Allan Pett |

It is certified that error appears in the above-identified patent and that said Letters Patent is hereby corrected as shown below:

<u>Column 8,</u>
Line 67, "500° C.;" should read -- 50° C.; --.

Signed and Sealed this

Twenty-first Day of March, 2006

JON W. DUDAS
*Director of the United States Patent and Trademark Office*